United States Patent
Windorfer

(10) Patent No.: US 8,998,215 B2
(45) Date of Patent: Apr. 7, 2015

(54) ARRANGEMENT FOR OVERCOMING AN OBSTRUCTION TO TRAVELING MOVEMENT

(71) Applicant: Vorwerk & Co. Interholding GmbH, Wuppertal (DE)

(72) Inventor: Harald Windorfer, Mettmann (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 0 days.

(21) Appl. No.: 14/107,145

(22) Filed: Dec. 16, 2013

(65) Prior Publication Data

US 2014/0166375 A1      Jun. 19, 2014

(30) Foreign Application Priority Data

Dec. 17, 2012   (DE) .......................... 10 2012 112 402

(51) Int. Cl.
*B60B 15/18*    (2006.01)
*A47L 9/00*     (2006.01)
*A47L 9/28*     (2006.01)

(52) U.S. Cl.
CPC ............. *B60B 15/18* (2013.01); *A47L 2201/04* (2013.01); *A47L 9/009* (2013.01); *A47L 9/28* (2013.01); *A47L 9/2852* (2013.01)

(58) Field of Classification Search
CPC ........... A47L 9/00; A47L 9/28; A47L 9/2852; B62J 5/007; B60B 15/18
USPC .............................................. 180/8.1, 8.2, 218
See application file for complete search history.

(56) References Cited

U.S. PATENT DOCUMENTS

| 5,228,709 | A  | * | 7/1993 | Kao ........................... 280/250.1 |
| 6,752,400 | B2 | * | 6/2004 | Nakatsukasa et al. ......... 280/5.2 |
| 6,935,447 | B2 | * | 8/2005 | Bierma ......................... 180/8.2 |
| 7,673,710 | B2 | * | 3/2010 | Lee et al. ...................... 180/8.2 |
| 7,837,201 | B2 | * | 11/2010 | Cheng et al. .................. 280/5.2 |
| 2002/0104692 | A1 | * | 8/2002 | Nakatsukasa et al. ......... 180/8.3 |
| 2004/0262060 | A1 | * | 12/2004 | Kim ............................. 180/65.5 |
| 2007/0137905 | A1 | * | 6/2007 | Lee et al. ........................ 180/21 |

* cited by examiner

*Primary Examiner* — Kevin Hurley
(74) *Attorney, Agent, or Firm* — Collard & Roe, P.C.

(57) ABSTRACT

The invention relates to an arrangement (9) for overcoming an obstruction (8) to traveling movement, preferably on an automatically traveling floor cleaning appliance (1) having a driven travel wheel (3). To configure an arrangement of the kind in question in an improved manner, it is proposed that on the travel wheel (3), a lifting part (10) is mounted in an eccentrically pivotable manner, the lifting part protruding with a front end surface (12) beyond a running surface (7) of the travel wheel (3) in the direction of travel (r), a counter mounting being provided which is fixed to the housing.

8 Claims, 5 Drawing Sheets

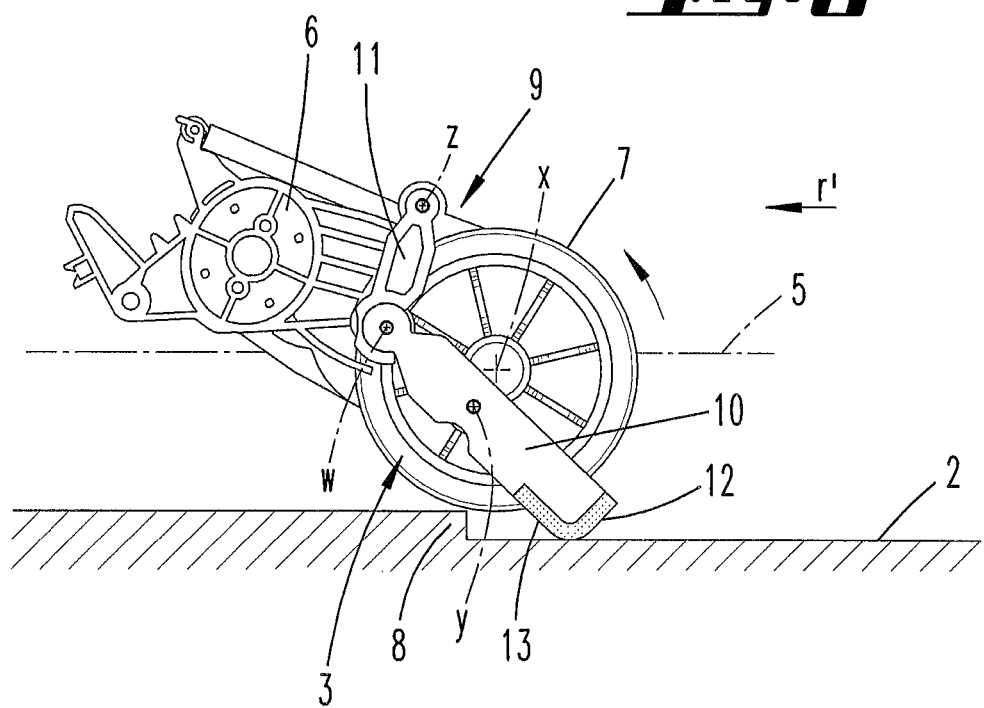

ARRANGEMENT FOR OVERCOMING AN OBSTRUCTION TO TRAVELING MOVEMENT

The invention relates to an arrangement for overcoming an obstruction to traveling movement, preferably on an automatically traveling floor cleaning appliance having a driven travel wheel.

Automatically traveling floor cleaning appliances are known, in particular in the form of autonomously operating robotic vacuum cleaning and/or sweeping appliances, further in particular for cleaning and maintaining floor coverings in the household sector. Such a robotic vacuum cleaning/sweeping appliance is known, for example, from DE 10242257 A1. Such appliances have at least one driven travel wheel, more preferably two such travel wheels, in particular for automatic movement, in particular on the floor to be cleaned. There is a need to also have the floor cleaning appliance automatically travel over obstructions on the floor that have a small height of, for example, up to 20 mm, such as, for example, door sills.

In this regard, solutions are known in which the cleaning appliance has a lifting device, the lifting device comprising a separate drive (cf. DE 202008017137 U1). Upon detecting an obstacle, the lifting device is activated, resulting in particular from monitoring the surroundings of the floor cleaning appliance in the course of the traveling thereof.

In view of the known prior art, it is regarded to be a technical object of the invention to configure an arrangement of the kind in question in an improved manner.

A possible approach to achieving the object is provided according to a first concept of the invention by an arrangement which is designed such that on the travel wheel, a lifting part is mounted in an eccentrically pivotable manner, the lifting part protruding with a front end surface beyond a running surface of the travel wheel in the direction of travel, a counter mounting being provided which is fixed to the housing. As a result of this configuration, an arrangement for overcoming an obstruction to traveling movement is provided which is in particular characterized by a structurally simple design. Due to the eccentrically pivotable mounting of the lifting part on the travel wheel in interaction with a counter mounting of the lifting part which is fixed to the housing, advantageous kinematics for lifting the floor cleaning appliance on or over an obstacle in the travel path is provided. By using the eccentrically pivotable lifting part, the travel wheel, and via said travel wheel the floor cleaning appliance as a whole, is lifted onto the obstacle to be traveled over, the traveling over the obstacle advantageously being independent of the diameter of the travel wheel, which in turn has an advantageous effect on the overall configuration of the floor cleaning appliance. At least in one pivoting position, a front end surface of the lifting part protrudes, relative to a projection in the direction of extent of the travel wheel axis, beyond the running surface of the travel wheel in the customary direction of travel of the appliance so that sensing of potential obstacles in front of the travel wheel is enabled. The lifting part acts in a lever-like manner as soon as it engages by way of the portion protruding beyond the running surface of the travel wheel against an obstacle that is on a higher level than the floor on which the travel wheel rests.

In a preferred configuration, it is provided that the lifting part is moved only by the drive of the travel wheel. The lifting part is preferably moved directly by the travel wheel on which the lifting part is mounted in an eccentrically pivotable manner. In a preferred arrangement of two travel wheels and a further preferred arrangement of two lifting parts associated in each case with one travel wheel, the lifting parts, in a preferred configuration, are each moved by the travel wheel on which they are mounted in an eccentrically pivotable manner. Alternatively, an indirect movement of the lifting part is also possible, for example due to a rigid connection between two or more lifting parts, only one lifting part being moved directly by a travel wheel.

In a preferred configuration, a mounting axis of the lifting part runs parallel to an axis of rotation of the travel wheel, and further preferably, the mounting axis runs transversely with respect to a customary traveling movement of the appliance, in particular in parallel alignment with the floor plane to be traveled on.

In a further preferred configuration, the eccentricity of the pivot point of the lifting part on the travel wheel in relation to the axis of rotation of the travel wheel is one-twentieth to up to one-half of the diameter of the travel wheel, more preferably one-eighth to up to one-fourth of the diameter, more preferably approximately one-sixth of the diameter.

In the position of the lifting part protruding furthermost beyond the running surface of the travel wheel in the customary direction of travel of the appliance, in a preferred configuration the front end surface of the lifting part protrudes one-twentieth to up to one times the diameter of the travel wheel, more preferably one-third to one-fifth, in particular approximately one-fourth of the diameter, beyond the running surface of the travel wheel.

In a preferred refinement it is provided that in the furthermost retracted position, the end surface is flush with the running surface, or, relative to a customary direction of travel of the appliance, remains behind same. Accordingly, in the furthermost retracted position, the end surface preferably does not protrude beyond the circumferential circular contour of the travel wheel or the running surface in a projection in the direction of the axis of rotation of the travel wheel; rather, the end surface preferably is flush with this circumferential circular line of the running surface or lies within the projected area delimited by the circular line of the running surface.

In a preferred configuration, the lifting part has a lifting surface in its front end region, which, further preferably, hereby incorporates the end surface. In a position of the lifting part freely protruding in a customary direction of travel beyond the running surface, the lifting part is supported by way of this lifting surface on an obstacle, for example, on a sill to be traveled over. Thus, a defined region of the lifting part is provided which is formed for interacting with the obstruction.

In one configuration, the lifting surface has a slip-resistant design, for example a profiling of the surface, further preferably a finely serrated surface, for interacting in a friction-locked or force-fit manner with a facing surface of the obstruction. In a preferred configuration, the lifting surface is formed, at least partially, by a soft material such as, for example, soft rubber or soft plastics, which in interaction with the supporting surface of the obstacle to be traveled over provides for adhesion that facilitates lifting the appliance.

To further facilitate the lifting of the travel wheel or wheels and therefore the lifting of the appliance when the lifting part is supported on a facing surface, in a preferred configuration the coefficient of friction in the region of the lifting surface is selected to be greater than that of the running surface of the travel wheel. Thus, further preferably, the running surface of the travel wheel is formed from a material that is hard compared to the lifting surface, such as, for example, hard plastics or hard rubber.

In a preferred configuration, the mounting of the lifting part on the housing is formed by means of a control arm that connects the housing to the lifting part. This control arm is preferably connected to the housing of the appliance or to a chassis portion connected to the housing of the appliance so as to be pivotable about an axis that runs parallel to the mounting axis of the lifting part and thus, further preferably, runs parallel to the axis of rotation of the travel wheel. Further preferably, the connecting axis between the control arm and the lifting part likewise runs parallel to the aforementioned axes.

In a preferred configuration, the control arm mounting on the housing is provided above the axis of the travel wheel and further preferably is associated with a plane which in the customary traveling state of the appliance runs parallel to the floor surface and is at least approximately tangent to the running surface of the travel wheel. In an alternative configuration, the control arm mounting on the housing is provided below the travel wheel axis.

With regard to the disclosure, the ranges and value ranges or multiple ranges specified above and below also include all intermediate values, in particular in increments of 1/10 of the respective dimension, where applicable also without dimension, in particular 1.01-fold, etc., on the one hand for limiting the mentioned range limits at the lower and/or upper limits, and, alternatively or additionally, also with regard to the disclosure of one or more individual values from the respectively specified range.

The invention is explained below with reference to the accompanying drawings, which illustrate only one exemplary embodiment. In the figures:

FIG. 8 shows a illustration subsequent to FIG. 7, relating to an intermediate position in the course of the lifting of the travel wheel or the appliance onto the obstacle.

Figure 1:
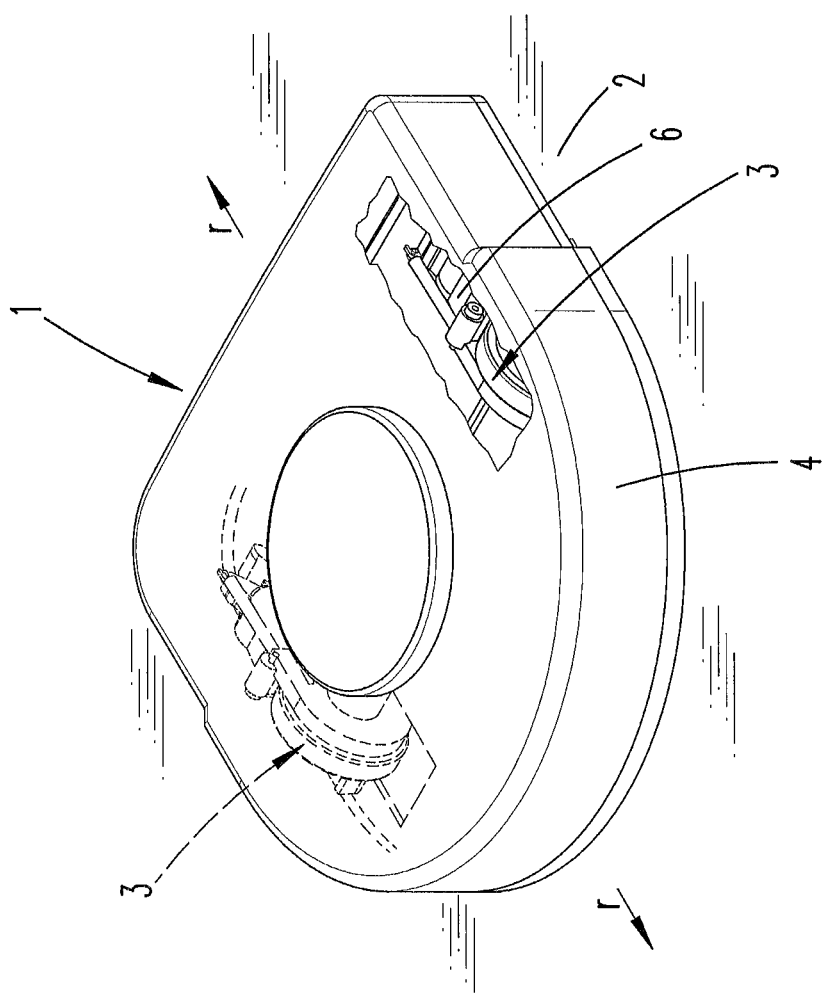
FIG. 1 shows a floor cleaning appliance in a partially cut-open perspective illustration.
Figure 2:
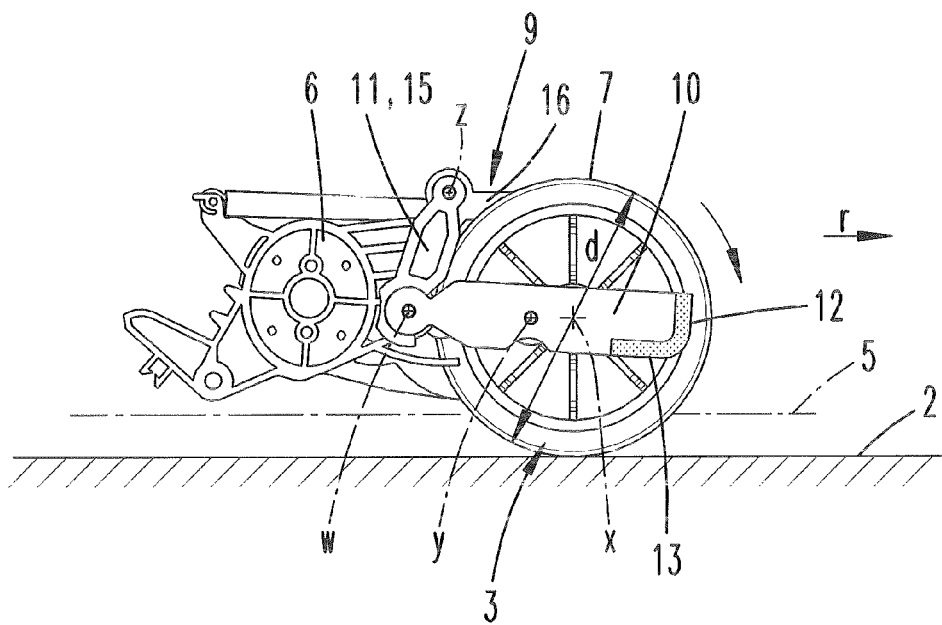
FIG. 2 shows a side view of a travel wheel of the appliance having a swing arm carrying the travel wheel, and an arrangement for overcoming an obstruction to traveling movement, with the appliance traveling in the customary direction of travel.
Figure 3:
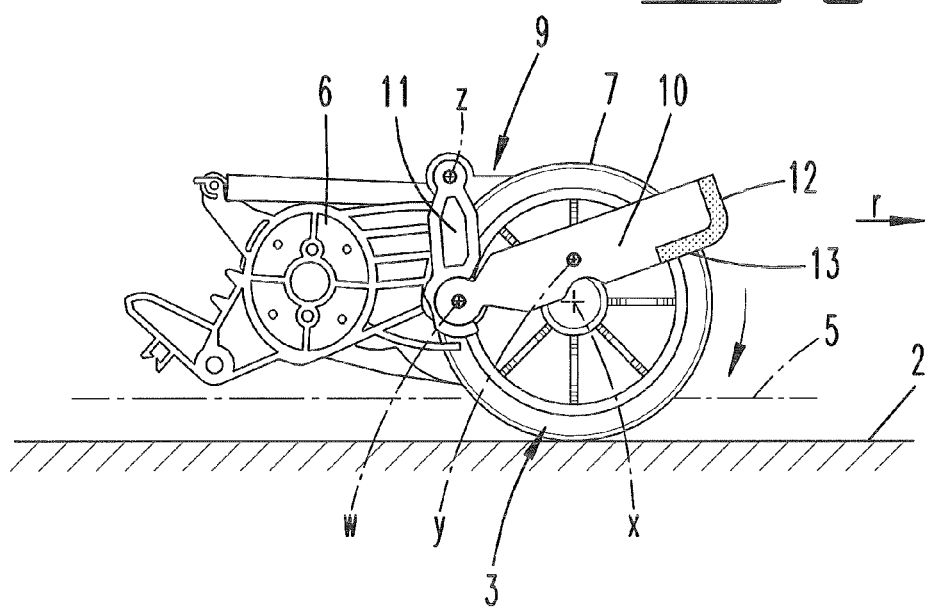
FIG. 3 shows a illustration subsequent to FIG. 2, relating to an intermediate position of the arrangement during further travel of the appliance.

Illustrated and described in first instance with reference to FIG. 1 is an automatically traveling floor cleaning appliance 1 with a chassis that has driven travel wheels 3 driven by an electric motor on the lower side facing the floor 2 to be cleaned. The chassis is covered by an appliance cover 4.

The appliance 1 preferably has an electromotively driven brush, not illustrated, which passes through the chassis bottom 5 for brushing the floor 2 and which in a further preferred embodiment passes through a suction nozzle through which the floor 2 is suctioned by means of a suction air flow.

The individual electrical components of the appliance 1 are supplied with power by a rechargeable battery, not illustrated.

The rotational axes x of the travel wheels 3 are oriented transversely with respect to a customary direction of travel r of the floor cleaning appliance 1, it being further preferred that the travel wheels 3 are arranged on both sides of a central vertical appliance axis of the floor cleaning appliance 1.

Each travel wheel 3 is secured on a trailing arm 6 that is pivotably mounted on the chassis or the appliance 1. These trailing arms 6 are mounted to be pivotable about a pivot axis that runs parallel to the axis of rotation x of the associated travel wheel 3.

Each travel wheel 3 has a circumferential running surface 7, preferably made of a hard material such as hard plastics, for example.

To be able to better travel over potential obstructions 8 to traveling movement on the floor, such as, for example, sills, in particular in the direction of travel r, but also in the opposite direction of travel r', an arrangement 9 for overcoming such obstructions 8 to traveling movement is provided. Such an arrangement 9 is preferably associated in each case with a travel wheel 3.

To this end, the arrangement 9 in first instance has a lifting part 10. This is essentially a climbing lever-like arm which is preferably associated with a wide side of the travel wheel 3 and is mounted in this region. Alternatively, such lifting parts 10 can be provided on both sides of the respective travel wheel 3.

The lifting part 10 is formed as an elongated flat part and is mounted on the travel wheel 3 so as to be eccentrically pivotable about the axis of rotation x thereof. The pivot axis y is situated on a circular line of the travel wheel 3 which is in concentric alignment with the axis of rotation x, and which has a diameter that preferably corresponds to one-fifth to one-sixth of the diameter d of the travel wheel.

Starting from the pivot axis y, the lifting part 10 freely protrudes by a dimension a which corresponds approximately to 0.5- to 0.6-fold of the diameter d of the travel wheel. In the direction opposite thereto, the lifting element 10 preferably extends in extension of the freely protruding portion, the respective end region being connected in an articulated manner to a control arm 11. This control arm 11, in turn, is pivotably mounted on the appliance 1 or the trailing arm 6.

The control arm axis z is preferably situated above the axis of rotation x, and further preferably is aligned parallel to the axis of rotation x, it being further preferred that the pivot axis w between the control arm 11 and the lifting part 10 also runs parallel thereto.

The lifting part 10 is preferably driven directly via the associated travel wheel 3, the pivot axis y in particular, and, moreover, accordingly also the free front end surface 12 of the lifting part 10, extending on an at least approximately elliptical path.

Associated with the end surface 12, a lifting surface 13 is formed on the lifting part 10. This lifting surface initially tends to face vertically downwardly, but more preferably extends into the end surface 12. At least the lifting surface 13 is preferably formed by a soft material such as soft rubber or soft plastics, for example, it being further preferred that the lifting part 10 and the control arm 11 are formed from hard plastics.

Due to the eccentric securing of the lifting part 10 on the travel wheel 3 and the oscillating mounting via the control arm 11, in particular the lifting surface 13 is guided on a practically elliptical path, the lifting part 10 during a movement of the floor cleaning appliance 1 in the customary direction r of travel tending to be moved upwardly and forwardly in the course of a displacement of the lifting part from a farthest-back position into a farthest-forward position freely protruding beyond the running surface 7, which, further preferably, takes place as a result of the proposed eccentric pivot point above the axis of rotation x.

When the pivot axis y reaches the region below the axis of rotation x of the travel wheel, the lifting part 10 with its free end having the lifting surface 13 is tilted downwardly toward the floor 2, the lifting part 10 simultaneously being retracted into a retracted position in which the end surface 12 preferably lies within the projection area of the travel wheel 3.

If there is no obstruction 8 to traveling movement within the travel path, the lifting part 10, in particular the lifting surface 13 thereof, does not come into contact with the floor 2, so that the floor cleaning appliance 1 can move unhindered via the travel wheels 3.

Figure 4:
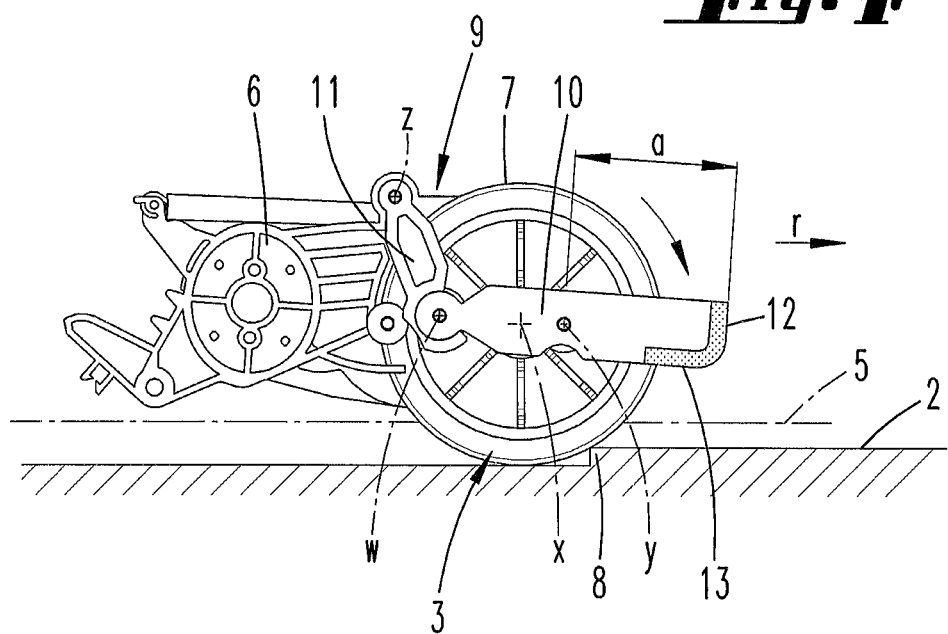
FIG. 4 shows a further subsequent illustration.
Figure 5:
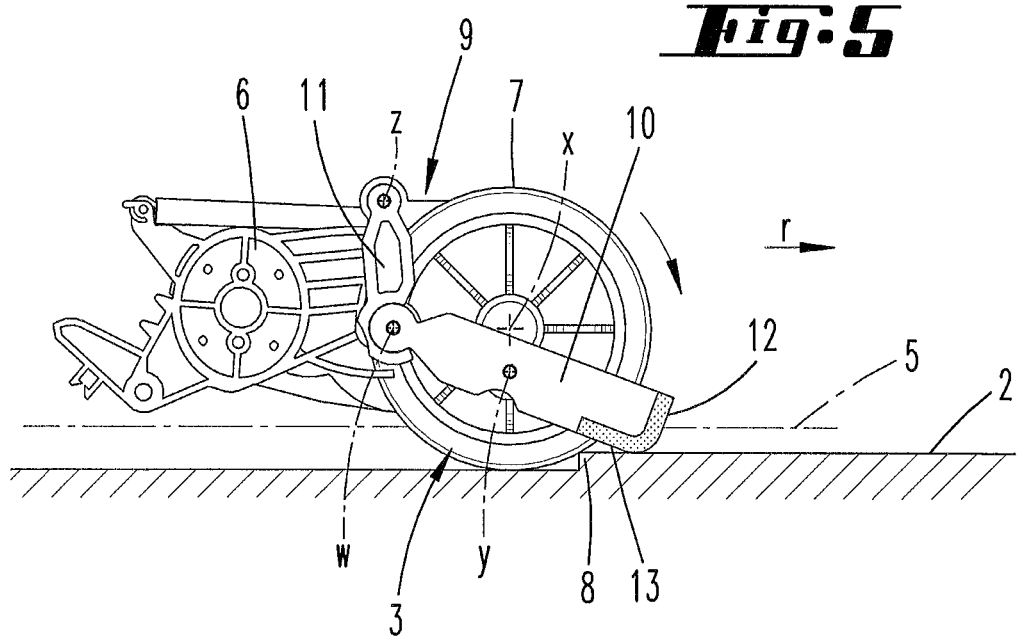
FIG. 5 shows a illustration subsequent to FIG. 4 with a lifting part coming down for lifting the travel wheel onto the obstruction to the traveling movement.
Figure 6:
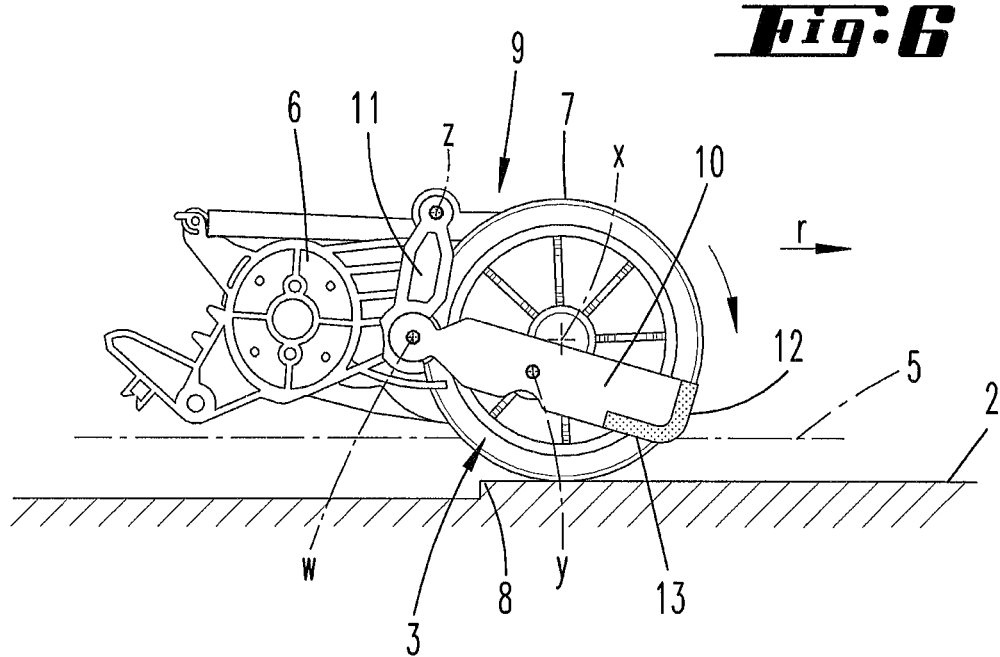
FIG. 6 shows a illustration subsequent to FIG. 5, relating to the position after lifting of the travel wheel onto the obstacle.
Figure 7:
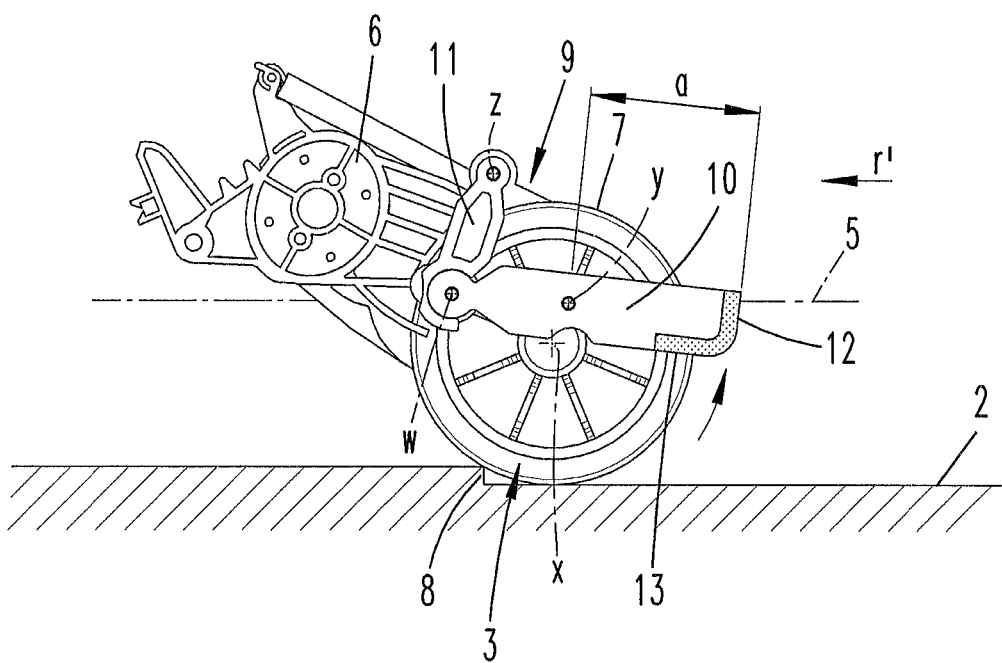
FIG. 7 shows an illustration corresponding to FIG. 4, but during travel of the appliance opposite to the customary direction of travel.

However, as illustrated for example in FIG. 4, if there is an obstruction 8 to traveling movement in the travel path (for the customary direction of travel), for example in the form of a floor sill, the lifting part 10 engages onto the obstruction 8 by way of the lifting surface 13, in the course of the forward displacement in the direction of travel r and the lowering of the lifting part. Due to the further electromotive rotational displacement of the associated travel wheel 3, the given kinematics, and the frictionally-engaged support of the lifting surface 13 on the obstruction 8 to traveling movement result in lifting of the travel wheel 3, and therefore of the entire appliance 1 (see FIG. 6).

In a preferred configuration, the running surface 7 is provided with a lower coefficient of friction than the lifting surface 13. Furthermore, the running surface 7 is preferably selected such that upon abutment of the running surface 7 against an edge of an obstruction (as illustrated, for example, in FIG. 4), the travel wheel 3 possibly rotates right away due to the corresponding blocking by the obstruction 8 of further travel. However, due to the further rotation of the travel wheel 3 right away, the lifting part 10 is moved into the position that lifts the travel wheel 3.

During the continuous movement of the lifting part 10, the lifting part may possibly pull the travel wheel against the obstruction 8 to traveling movement so that, beginning at a suitable lead angle, the travel wheel 3 can travel onto the obstruction 8 to traveling movement.

During reverse travel (direction of travel r'), i.e., during travel of the appliance 1 opposite to the customary direction of travel r, the travel drive, i.e., the trailing arm 6, pivots upwardly when the running surface 7 abuts against an edge of an obstruction according to FIG. 8 in such a manner that the associated travel wheel 3 extends further out from the chassis bottom 5, this taking place along with an increase of the floor clearance, i.e., with an increase of the spacing between the floor 2 and the chassis bottom 5.

Due to the changed alignment and position of the trailing arm 6, and therefore also of the pivot mount of the control arm 11 on the trailing arm 6, the lifting surface 13 of the lifting part 10 reaches the floor 2 in the course of the rotation of the travel wheel 3, whereupon in the course of the further rotation of the travel wheel 3, the lifting part 10 lifts the travel wheel so that it can travel onto the obstruction 8 to traveling movement.

In the case of an arrangement of two travel wheels 3, the two lifting parts 10 can be mechanically coupled to one another. A configuration is preferred in which each lifting part 10 is driven directly by the associated travel wheel 3, so that it is thus possible to lift only one travel wheel 3 when there is a corresponding obstruction to traveling movement.

Due to the arrangement of one or more lifting parts 10, travel wheels 3 with relatively small diameters can be used, which advantageously has a positive effect on the overall height of the appliance.

The embodiments described above are used to explain the entirety of the inventions encompassed by the patent application, each of the inventions independently refining the prior art by the following feature combinations, namely:

An arrangement 9 that is characterized in that a lifting part 10 is mounted in an eccentrically pivotable manner on the travel wheel 3, the lifting part protruding with a front end surface 12 beyond a running surface 7 of the travel wheel 3 in the direction of travel r, a counter mounting 15 being provided which is fixed to the housing 16.

An arrangement that is characterized in that the lifting part 10 is moved only by the drive of the travel wheel 3.

An arrangement that is characterized in that a mounting axis y of the lifting part 10 runs parallel to an axis of rotation x of the travel wheel 3.

An arrangement that is characterized in that the eccentricity is $\frac{1}{20}$ to $\frac{1}{2}$ of the diameter d of the travel wheel 3.

An arrangement that is characterized in that in the furthermost protruding position of the lifting part 10, the front end surface 12 protrudes beyond the running surface 7 by $\frac{1}{20}$ up to one times the diameter d of the travel wheel 3.

An arrangement that is characterized in that in the furthermost retracted position, the end surface 12 is flush with the running surface 7 or remains behind same.

An arrangement that is characterized in that in its front region, the lifting part 10 has a lifting surface 13.

An arrangement that is characterized in that the lifting surface 13 is at least partially formed by a soft material such as soft rubber or soft plastics.

An arrangement that is characterized in that the running surface 7 of the travel wheel 3 is made of a hard material such as hard plastics.

An arrangement that is characterized in that the mounting 15 on the housing 16 is formed by means of a control arm 11 that connects the housing 16 to the lifting part 10.

An arrangement that is characterized in that the mounting of the control arm is provided above the axis of rotation x of the travel wheel 3.

LIST OF REFERENCE

1 Floor cleaning appliance
2 Floor
3 Travel wheel
4 Appliance cover
5 Chassis bottom
6 Trailing arm
7 Running surface
8 Obstruction to traveling movement
9 Arrangement
10 Lifting part
11 Control arm
12 End surface
13 Lifting surface
15 Counter Mounting
16 Housing
a Dimension
d Diameter
r Direction of travel
r' Direction of travel
w Pivot axis
x Axis of rotation
y Mounting axis
z Control arm axis

The invention claimed is:

1. An arrangement for overcoming an obstruction to traveling movement on an automatically traveling floor cleaning appliance having a driven travel wheel and a housing, wherein on the travel wheel, a lifting part is mounted in an eccentrically pivotable manner, the lifting part protruding with a front end surface beyond a running surface of the travel wheel in the direction of travel, a mounting being provided which is fixed to the housing, and wherein the mounting on the housing is formed via a control arm that connects the housing to the lifting part.

2. The arrangement according to claim 1, wherein the lifting part is moved only by the drive of the travel wheel.

3. The arrangement according to claim 1, wherein a mounting axis of the lifting part runs parallel to an axis of rotation of the travel wheel.

4. The arrangement according to claim 1, wherein the eccentricity is 1/20 to 1/2 of the diameter of the travel wheel.

5. The arrangement according to claim 1, wherein in the furthermost protruding position of the lifting part, the front end surface protrudes beyond the running surface by 1/20 up to one times the diameter of the travel wheel.

6. The arrangement according to claim 1, wherein in the furthermost retracted position, the end surface is flush with the running surface or remains behind same.

7. The arrangement according to claim 1, wherein in its front region, the lifting part has a lifting surface.

8. An arrangement for overcoming an obstruction to traveling movement on an automatically traveling floor cleaning appliance having a driven travel wheel and a housing, wherein on the travel wheel, a lifting part is mounted in an eccentrically pivotable manner, the lifting part protruding with a front end surface beyond a running surface of the travel wheel in the direction of travel, a mounting being provided which is fixed to the housing, wherein the mounting is above the axis of rotation of the travel wheel.

* * * * *